United States Patent [19]
Long et al.

[11] Patent Number: 5,987,862
[45] Date of Patent: Nov. 23, 1999

[54] APPARATUS AND METHOD FOR SIMULTANEOUSLY TOPPING AND APPLYING A PRECISION APPLICATION OF SUCKER CONTROL CHEMICALS TO TOBACCO AND OTHER ROW CROPS

[75] Inventors: Raymond C. Long; Heinz Seltmann, both of Raleigh; R. Wayne Barnhardt, Kannapolis, all of N.C.

[73] Assignees: North Carolina State University, Raleigh; Hydraulic & Pneumatic Sales, Inc., Charlotte, both of N.C.

[21] Appl. No.: 08/962,495

[22] Filed: Oct. 31, 1997

[51] Int. Cl.[6] .................................................. A01D 45/16
[52] U.S. Cl. ................................ 56/27.5; 56/16.8; 47/1.7
[58] Field of Search ............................. 56/27.5, 1, 16.8, 56/327.1, 327.2, DIG. 2, DIG. 17; 47/1.7

[56] References Cited

U.S. PATENT DOCUMENTS

| | | | |
|---|---|---|---|
| 3,834,137 | 9/1974 | Long | 56/27.5 |
| 3,866,397 | 2/1975 | Koziol | 47/1.7 X |
| 3,959,924 | 6/1976 | Allen, Jr. | 47/1.43 |
| 5,086,582 | 2/1992 | Hamilton | 47/1.7 |
| 5,329,752 | 7/1994 | Milbourn | 56/16.8 X |
| 5,809,440 | 9/1998 | Beck et al. | 47/1.7 X |

OTHER PUBLICATIONS

Seltmann, Heinz, "Contact Suckercide Effectiveness: A Comparison of Theoretical and Actual Results", *Tobacco Science*, Aug. 1994, 58–61.

Marshall, Jr. et al., *Topping/Sucker Control Program*, Rev. Mar. 14, 1983.

*Primary Examiner*—H. Shackelford
*Attorney, Agent, or Firm*—Jenkins & Wilson, P.A.

[57] ABSTRACT

An apparatus for simultaneously topping and precisely applying sucker control chemicals to tobacco plants and for related uses wherein the apparatus comprises a housing wherein the front and bottom of the housing are open. A blower is positioned in the top of the apparatus for creating a downwardly directed air stream to facilitate decapitating the tobacco plants by a mechanical cutter positioned in the bottom of the apparatus as the tobacco plants pass therebeneath. A pair of spaced-apart rotating belts are located beneath the mechanical cutter and define a pathway from the front to the back of the housing and act to gather tobacco plants at the front and guide the tobacco plants through the housing. A spray manifold is provided for applying sucker control chemicals downwardly in a confined pattern onto decapitated tobacco plants as they pass from the mechanical cutter and beneath the spray manifold. Circuit means is provided for actuating application of the sucker control chemicals by the spray manifold when the tobacco plants are properly oriented substantially beneath the spray manifold.

19 Claims, 6 Drawing Sheets

APPARATUS AND METHOD FOR SIMULTANEOUSLY TOPPING AND APPLYING A PRECISION APPLICATION OF SUCKER CONTROL CHEMICALS TO TOBACCO AND OTHER ROW CROPS

TECHNICAL FIELD

The present invention relates generally to applying agricultural chemicals to row crops, and more particularly to a new apparatus and method for simultaneously topping and applying sucker control chemicals to tobacco plants.

BACKGROUND ART

Tobacco is grown as a row crop with row widths and within-row plant spacings of about 1.07–1.22 m and 0.38–0.56 m, respectively. Most tobacco types are decapitated (topped) when the plants are in the early stages of floral development to increase yield and improve the quality of the cured leaf. Physiologically, decapitation of a dicotyledonous plant, such as tobacco, releases apical dominance, and growth of axillary buds (suckers) is dramatically increased. To obtain the increase in yield and quality desired from topping, the growth of the suckers must be controlled. In the early culture of tobacco, suckers were removed manually. Currently, in most cases, suckers are controlled with chemicals, most commonly fatty alcohols, dinitroanilines, and maleic hydrazide. A common protocol for flue-cured tobacco in the U.S. is to use fatty alcohols at topping, followed by a second application three to five days later, and then followed one week later by a tank mix of a dinitroaniline and maleic hydrazide. The fatty alcohols and the dinitroaniline materials must contact the sucker to effect control, while maleic hydrazide, which acts systemically, must be absorbed through the leaf tissue.

The method of application and the equipment used to control suckers varies with growers, from hand-held equipment to multi-row, over-the-top sprayers. The latter features a 56-cm long boom with a solid cone nozzle in the middle and nozzles at each end angled downward at 45 degrees toward the center of each row. Spraying is continuous as the sprayer moves along the row, the nozzles positioned about 25-cm above the topped tobacco, applying suckercide (chemical agent that suppresses sucker growth) solution (approximately 30 ml/plant).

Others have improved the efficacy of fatty alcohols by using guides to center each plant in the spray pattern, thereby directing more of the spray (chemical) down the stalk. It has been shown that 3 ml of fatty alcohol solution placed in each of the upper three leaf axils of a tobacco plant resulted in a high degree of control. Furthermore, missing any of the three upper axils greatly diminished sucker control down the stalk. In the U.S., this procedure would amount to a 70% reduction of chemical used per application when compared to an over-the-top application.

Based on this information, applicants designed and constructed an apparatus and method that would apply the sucker control chemical directly over the center (i.e., stalk) of the tobacco plant immediately after topping of the plant by the apparatus. The advantages are to: (1) decrease the volume of sucker control chemical used; (2) reduce production costs associated with topping and sucker control; and (3) reduce release of agrichemicals into the environment.

DISCLOSURE OF THE INVENTION

The present invention describes an apparatus (and method) for the precision application of reduced volumes of contact sucker control chemicals to tobacco plants. The apparatus mechanically decapitates ("tops") the tobacco plant and immediately thereafter applies a suckercide. Attached to the underside of a mechanical topper (most suitably mounted on a high-clearance sprayer) are a pair of spaced-apart rotating belt guides to gather and guide the plants into the topper where the plants are topped. A sensing device coupled to a counting and timing device determines the location of the plant within the pathway defined by the guide belts and activates a solenoid for a fraction of a second, thereby dispensing a low volume of chemical through a small spray manifold in a confined pattern directly over the cut stalk. To be effective, the chemical should make physical contact with each small sucker bud located in the angle made by the stalk and each leaf (leaf axil).

The applicants' novel apparatus applies the contact chemical where it will be most effective, that is, onto the stalk and to the petioles of the uppermost leaves where it is gathered and moves down to each leaf axil of the upper leaves and thereafter down the stalk wetting the axils located further down. Applicants' apparatus acts to increase effectiveness of a contact suckercide and to decrease the amount of chemical required by as much as one-half for any single pass through the field. Because the chemical is applied during the topping operation, the system also holds the potential to reduce the number of trips normally required to conduct topping and application of sucker control chemicals. Consequently, the amount of chemical placed into the environment can be reduced significantly.

It is therefore an object of the present invention to provide an apparatus and method for applying sucker control chemicals such that a greater proportion of the chemicals applied contact the tobacco leaf axils where suckers are located.

It is another object of the present invention to provide an apparatus and method that provides for the simultaneous topping of tobacco plants and the application of sucker control chemicals (suckercides) to tobacco plants in order to suppress sucker growth on tobacco plants.

It is another object of the present invention to provide an apparatus and method that reduces the amount of sucker control chemicals applied to tobacco plants by reducing the number of applications of sucker control chemicals to tobacco plants as well as the amount of sucker chemical applied per plant during each application.

It is still another object of the present invention to provide an apparatus and method for the application of sucker control chemicals to tobacco plants that eliminates the use of systemic sucker control chemicals which pose significant residue problems in the cured tobacco and/or in the soil.

It is still another object of the present invention to provide an apparatus and method that by simultaneously topping tobacco plants and applying sucker control chemicals serves to reduce the number of sucker control chemical application trips through the field and consequently reduce labor and operating costs, and serves to reduce the amount of sucker control chemicals utilized per plant so as to decrease the amount of chemicals placed into the environment.

Some of the objects of the invention having been stated hereinabove, other objects will become evident as the description proceeds, when taken in connection with the accompanying drawings as best described hereinbelow.

BEST MODE FOR CARRYING OUT THE INVENTION

Figure 1:
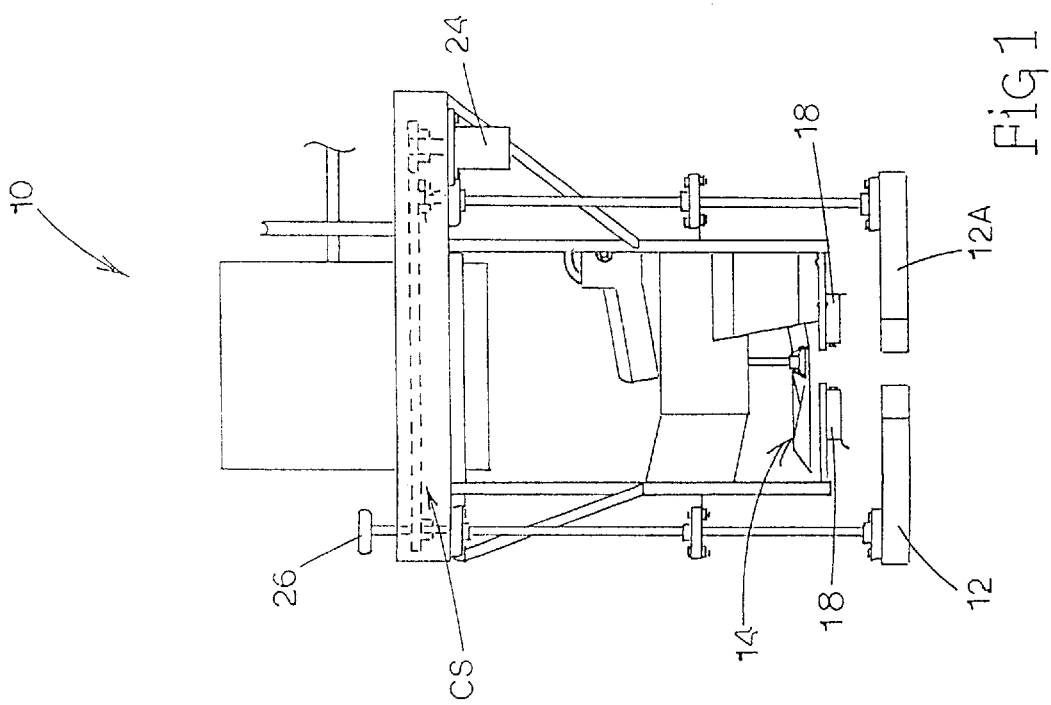
FIG. 1 is a front elevation view of the simultaneous tobacco plant topping and sucker control chemical application apparatus of the invention.
Figure 2:
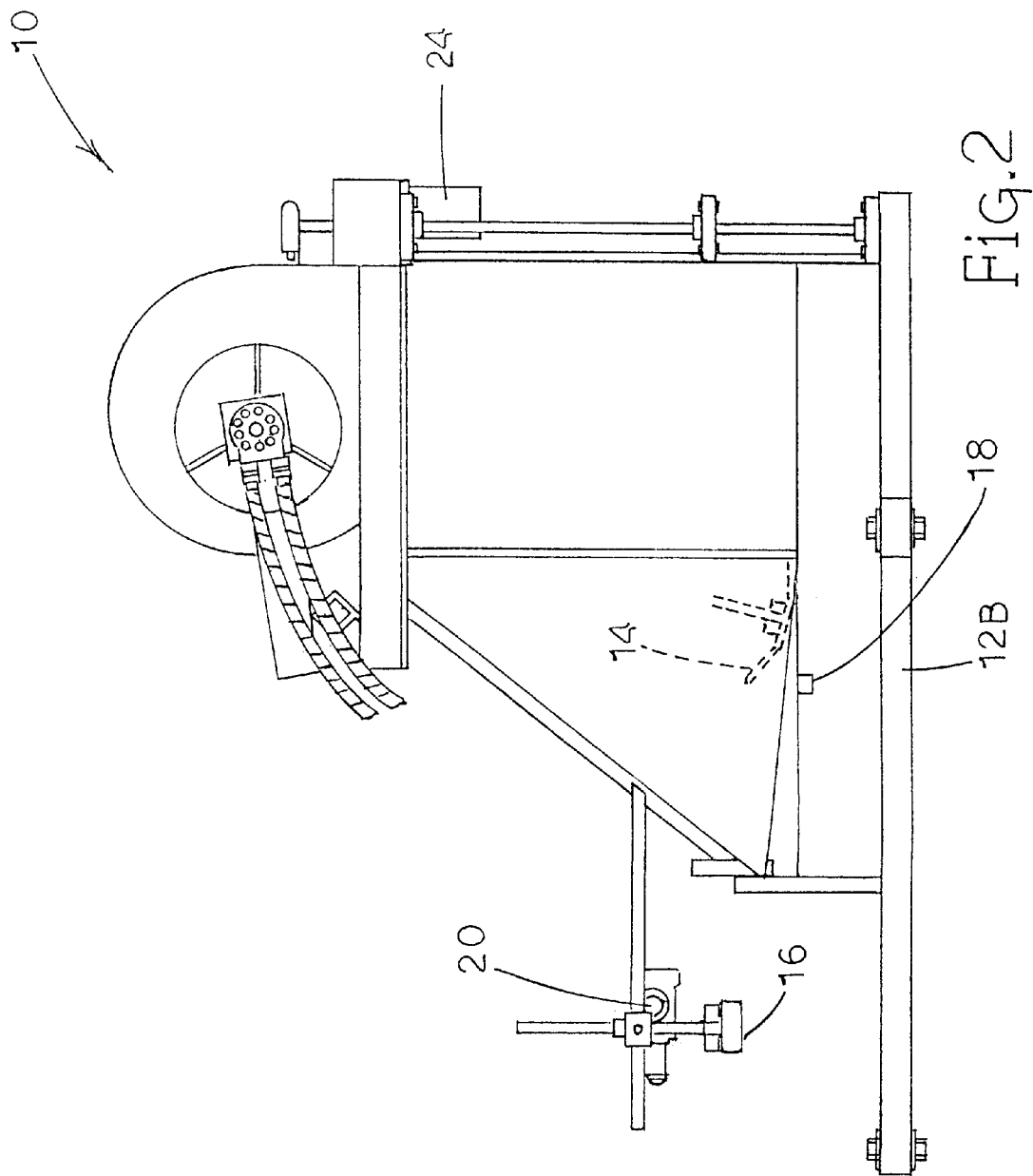
FIG. 2 is a left side elevation of the apparatus shown in FIG. 1.
Figure 3:
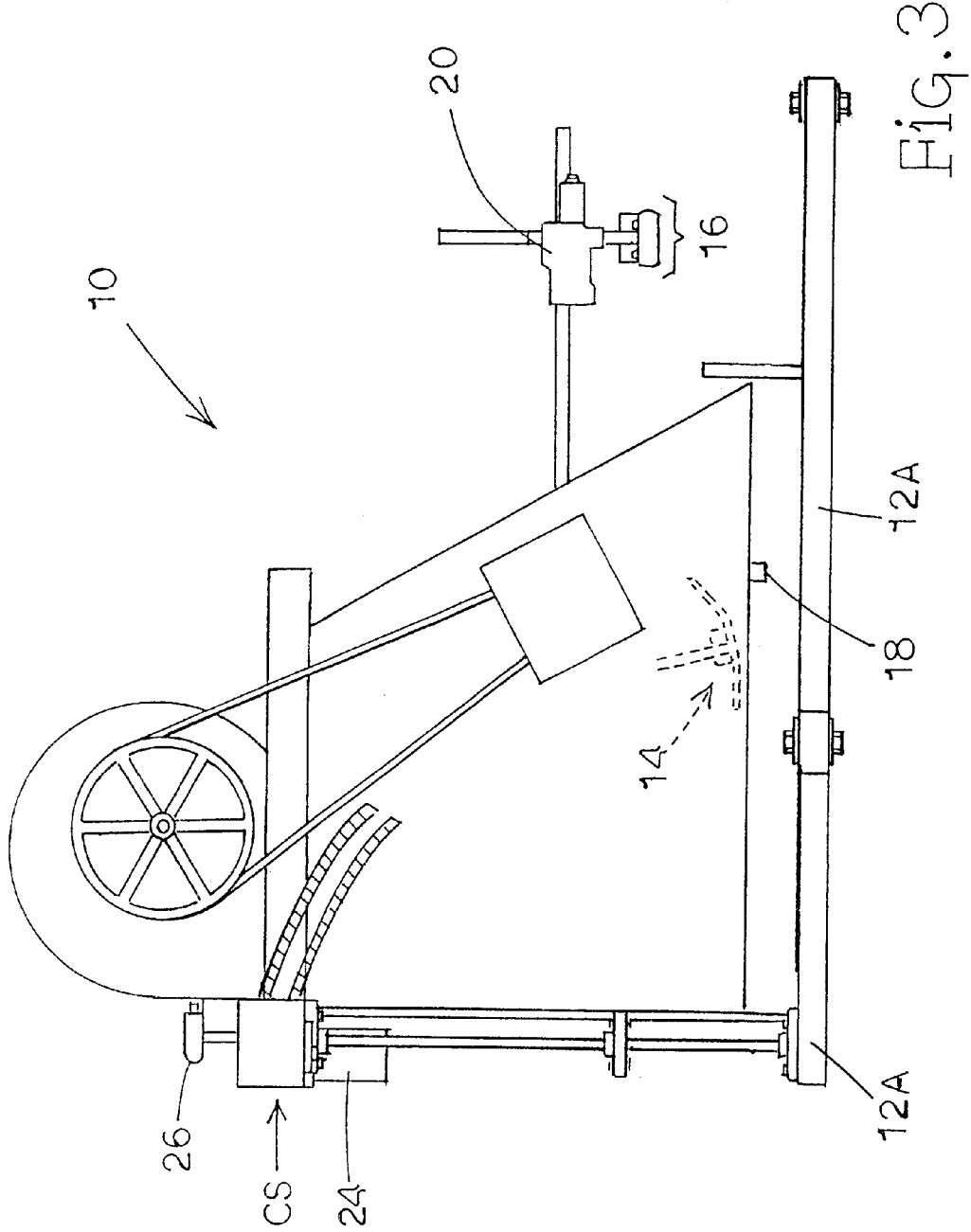
FIG. 3 is a right side elevation view of the apparatus shown in FIG. 1.

Referring now to FIGS. 1–6, the apparatus of the invention 10 is shown. Apparatus 10 could most suitably be used in combination with a high-clearance sprayer such as a Powell Model 4360 available from Powell Manufacturing Co. of Bennettsville, S.C. In this use, two or more of apparatus 10, such as Model 55 Aerotopper Head (Powell Manufacturing), could be mounted thereon. However, it will be appreciated that applicants' novel apparatus 10 can be used in a variety of different uses and configurations, and that the specific configuration and use of apparatus 10 described herein is for illustration purposes only and not intended to limit the scope of the invention in any manner whatsoever.

The sprayer to which two of apparatus 10 would be mounted is a three-wheel type, with all wheels being hydrostatically driven. Two apparatus 10, also hydraulically driven, would be mounted on the tool bar at the front of the sprayer (not shown) to provide a two-row unit. Basically, apparatus 10 is a modified topper head of the type consisting of an open-face hood (see FIG. 1) into which the tops of tobacco plants pass as the sprayer moves along the row. The floor of the hood is a horizontal, split configuration so that the plants are guided to an overhead, belt driven rotary knife. The topped tobacco plants exit the rear of the hood. A squirrel cage fan on top of the hood blows the leaves immediately below the height of the topper floor downward so that the tips of those leaves will not be removed by the knife. The structure described heretofore is the structure of a conventional topper of a type well known to those skilled in the art. Applicants have modified and improved the topper for effective simultaneous topping and sucker control chemical application as described in detail hereinbelow.

Applicants have improved the conventional topper as described herein to provide apparatus 10 for the simultaneous topping, and spraying of sucker control chemicals onto tobacco plants by the topper. Apparatus 10 can either be made by retrofitting a conventional topper as described herein or, alternatively, as an entirely new unit.

Applicants' precision sprayer attaches to the front and underside of a topper and incorporates a number of features: (1) a pair of hydraulically-driven, 10-cm wide, flat belts 12A, 12B in a Y configuration parallel to the row that gathers the tops of the plants into the row and actively guides them into knife 14 of the topper and then into position directly beneath a spray manifold 16 as the sprayer moves forward; (2) an electronic device 17 that takes a signal from the front drive wheel motor M (see FIG. 5) of the sprayer, determines actual ground speed, compares it to the speed of guide belts 12A, 12B and instantaneously modulates both belt speeds to match ground speed; (3) a pulsed, near-infrared light beam provided by SPOT SHOT™ sensor 18 available from Progressive Farm Products, Inc. of Hudson, Ill. and positioned 7.5-cm behind the center line of topper knife 14, 2.5-cm below the top of the cut tobacco stalk, and perpendicular to the tobacco row. The beam from sensor 18, when broken by the plant stalk, activates counting circuit 19 (see FIG. 5) to accumulate counts from drive motor encoder 22. At the pre-set count, the counters 19 output a signal to the timing circuit 19, that controls the opening and closing of solenoid valve 20 (Model 50665 available from Delavan Agricultural Products of Lexington, Tenn.) for a fraction of a second (typically 130 ms) thereby allowing sucker control chemical solution to flow to spray manifold 16; (4) an electronic counting device 19 (see FIG. 5) that determines the required ground displacement of the sprayer so that, upon reaching a preset count, the timer circuit is activated to open solenoid 20 to allow application of the chemical solution through spray manifold 16 directly over the top of the stalk while the machine is moving through the field at 4 to 7 km/hr; and (5) spray manifold 16 (about 8.2-cm in diameter) attached to solenoid 20 and located about 15-cm above the top of the newly cut tobacco stalk (and directly over the rear area of guide belts 12A, 12B) and about 34.3-cm behind the sensor light beam (which senses the location of the plant). Spray manifold 16 contains a changeable plate (1.6 mm thickness× 7.6-cm diameter) with a variable number of holes of specified diameters calculated to permit the passage of 15 ml of sucker control solution in 130 ms at $1.38 \times 10^5$ Pa. The pattern of the holes in the plates is confined within a diameter of 5.7-cm; the number of holes and their diameters range from 32/0.813 to 25/1.397 mm.

Figure 4:
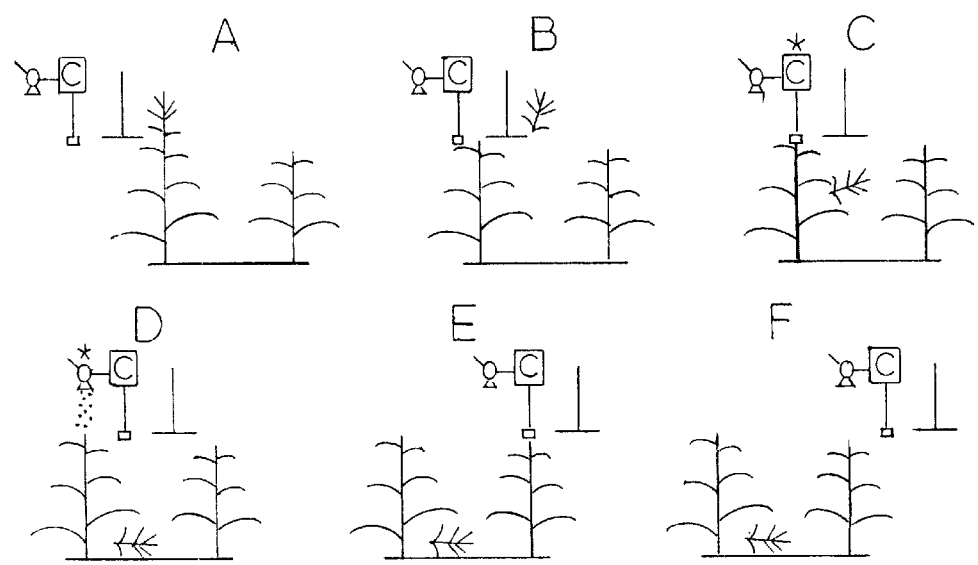
FIG. 4 is a schematic view of the use of the apparatus shown in FIG. 1 in practicing the method of the present invention.

Operation of apparatus 10 is illustrated in FIG. 4. Panels A through F show, in sequential order, how apparatus 10 tops and applies the sucker control chemical, while simultaneously by-passing plants too immature (short) to be sensed.

Theory of the Precision Application System

Figure 5:
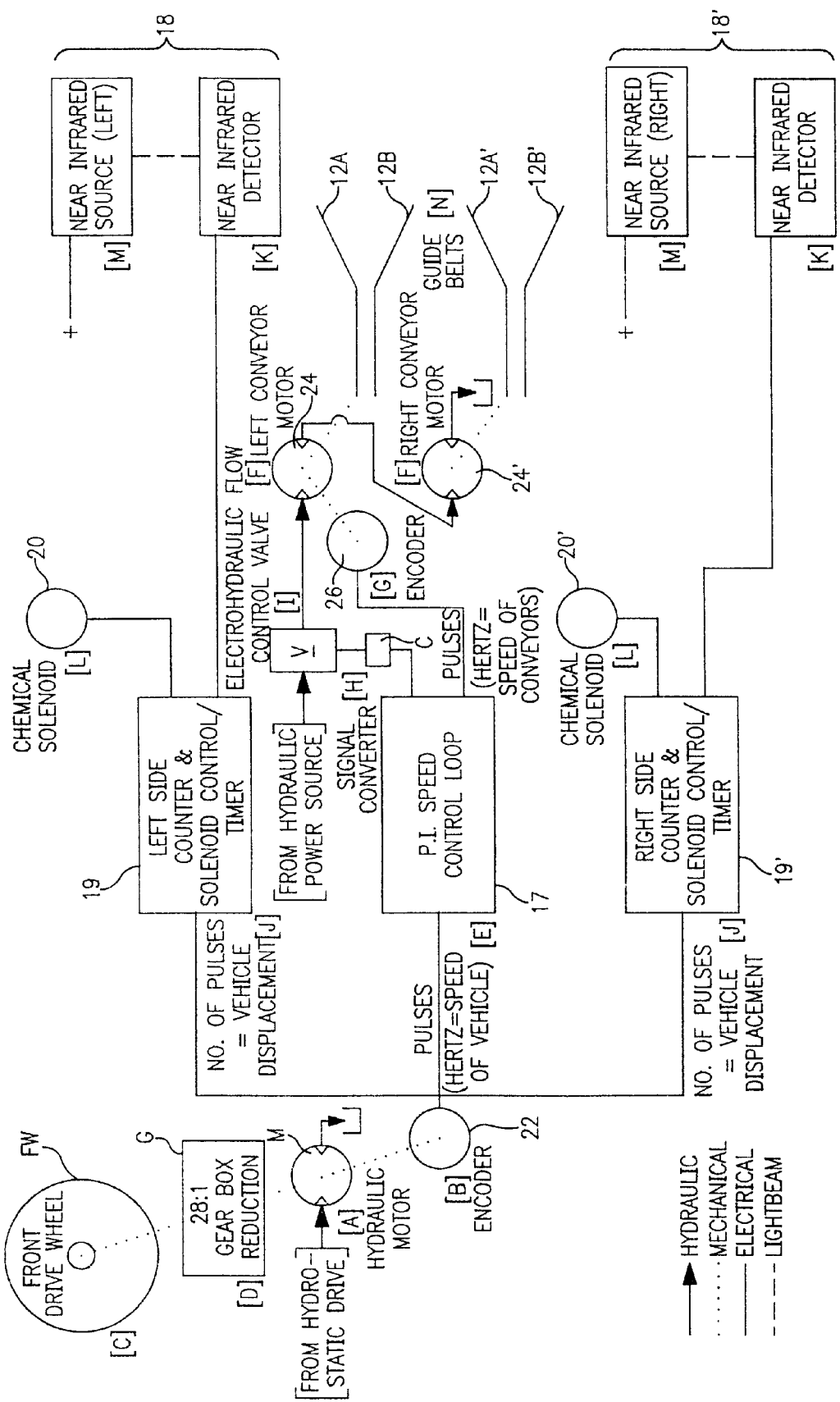
FIG. 5 is a schematic view of a first embodiment of the control system for the apparatus shown in FIG. 1.
Figure 6:
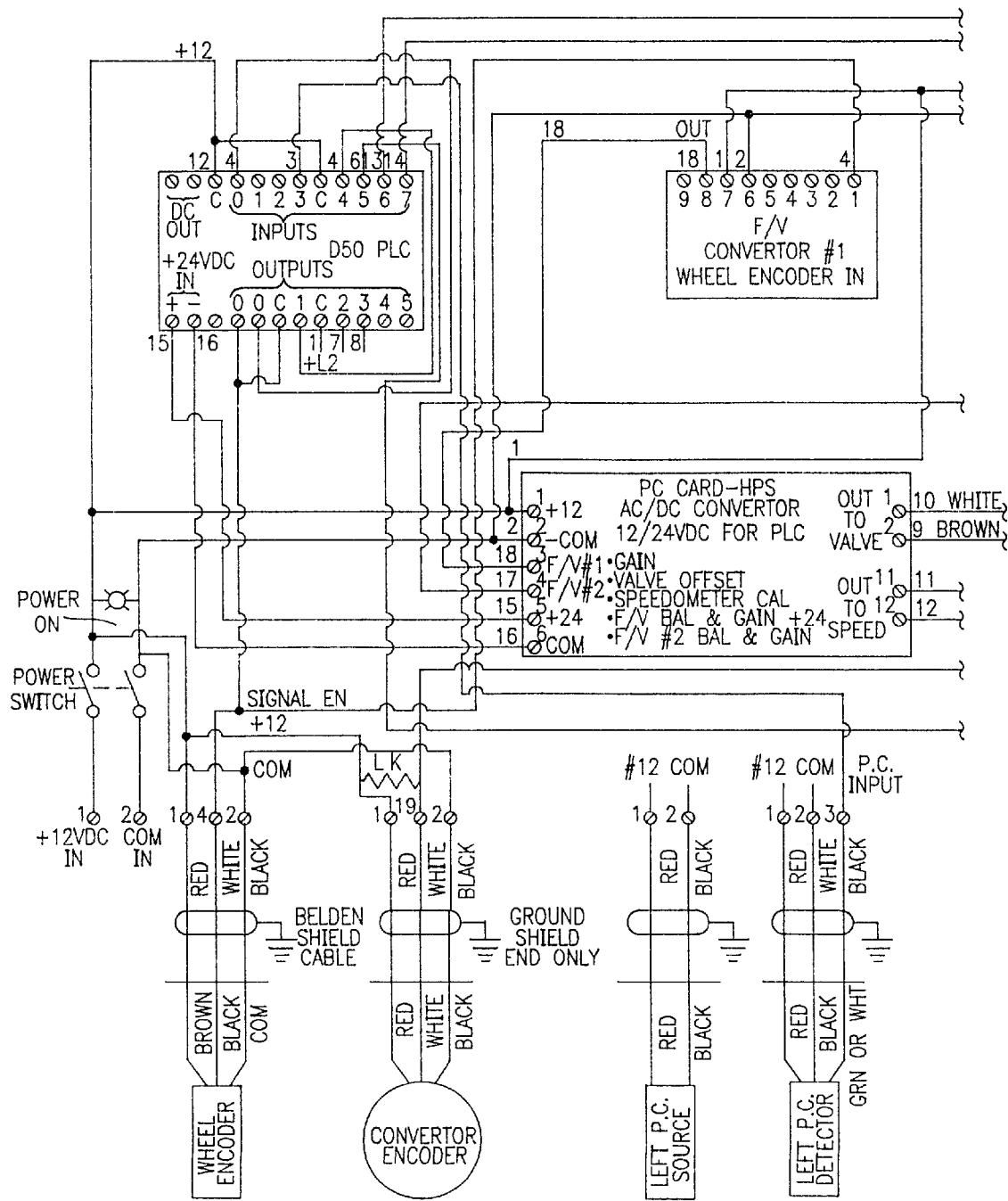
FIG. 6 is a schematic view of an alternative embodiment of the control system for the apparatus shown in FIG. 1 wherein the control system utilizes a PLC board for reduced cost and enhanced versatility.

The details of the preferred circuitry that permit the precision application of sucker control chemicals by apparatus 10 are shown in FIG. 5. It will be appreciated that FIG. 5 illustrates circuitry for actuating two apparatus 10 and that only one circuit is necessary to actuate a simple apparatus 10 if this were to be desired. The speed of hydraulic drive wheel motor M of the sprayer is determined by the machine operator. A wheel encoder 22 is attached to the drive wheel hydraulic motor M, which drives drive wheel FW through a 28:1 speed reducer G. Wheel encoder 22 produces 30 pulses (or counts) per revolution of hydraulic motor M. The circumference of the drive wheel is 2.84 m. Therefore, the resolution of the sprayer vehicle ground displacement is 3.38 mm/count.

The pulse train from wheel encoder 22 is fed to the P.I. (proportional/integral) speed control unit 17. Its frequency (hertz) is directly proportional to the vehicle speed in km/hr. This is the command signal for the right and left endless conveyor guide belts 12A, 12B of each apparatus 10. The two hydraulic conveyor motors 24, 24' are connected in series for both apparatus 10. The first conveyor motor 24 in the loop has a 100 pulse/revolution encoder 26. This provides the feedback reference for P.I. controller 17. The error signal (i.e., the difference between the command and feedback) is amplified and its output fed to signal converter C. Converter C converts the 0 to 10 v. D.C. error signal into a pulse width modulated signal to directly drive the electro-hydraulic proportional flow control valve V. The error signal is also multiplied by the integral function until the feedback exactly matches the command signal.

The left and right counters 19, 19' also look at the same signal as the P.I. controller 17. Each counter 19, 19' is controlled by a near infrared detector 18, 18'. When the detector senses a plant stalk, the counter is turned on and begins accumulating counts from drive motor encoder 22 representing ground displacement. At the preset count (operator adjustable), counters 19, 19' output a signal to corresponding chemical solenoids 20, 20' to open solenoids 20, 20' for a pre-determined time (operator adjustable). At the same time, counters 19, 19' are inhibited from counting (until the solenoid timer circuit closes) and are reset to zero for the next plant detection.

The near infrared light source of sensor 18 is a pulsed beam of near infrared light. The beam controls switch the source and detector synchronously at 500 hertz to prohibit the detector from picking up stray light that could cause false triggering of either counter 19, 19'.

The invention described herein to determine individual plant location uses a near infrared light beam that is broken by the passing plant. However, applicants contemplate an alternative method of determining the location of each plant in a row by visual imaging technology. This embodiment uses a monochrome CCD camera mounted above the crop to view the row in front of the vehicle and to capture images of the plants and stalks. The camera is fitted with a filter (near infrared or other) to increase the contrast between soil, plant, and stalk. Images are grabbed from the camera and processed with appropriate software to locate individual plant stalks within a row. Successive images from the camera are used to compile a visual map of the area between the camera field of view and the spray manifold. This provides a means of locating precisely an individual plant from the time the image is grabbed until the plant is sprayed. The visual imaging technology may have certain advantages over the near infrared light beam. For example, there may be less premature triggering of the light beam (and, hence, the spray manifold) by leaves protruding toward the apparatus as it travels along the row. This sensor may also be more advantageous in locating the center of other crop plants (untopped) which are being sprayed with various agrichemicals. Through pattern recognition, these images can also be used to differentiate between crop plants and weeds.

The hydraulic motors 24, 24' (see FIG. 5) drive the left and right pairs of endless belt conveyors 12A, 12B so that belt speed is synchronous with ground speed (opposing endless belts 12A, 12B in each conveyor unit are linked by a chain and sprocket system CS shown in phantom lines in FIG. 1). This permits tobacco plants to be guided upright into topper knife 14 and spray manifold 16 of each apparatus 10.

Experimental Tests

A number of experiments were conducted by applicants. Standard cultural practices for flue-cured tobacco were employed. Replicated tests utilized 2- or 4-row plots approximately 26 m in length. Only those treatments potentially pertinent to the efficacy of machine placement of the chemical will be discussed: flowering vs. non-flowering cultivars; topping height at first application of suckercide; number of suckercide applications; and visualization of movement of chemical down the stalk. Both flowering and non-flowering plants were included to determine the influence of architecture of the top of the plant on the performance and efficacy of the device. Topping and first application of suckercide chemical were made to the flowering type when the majority of the plants were in the early flower stage; the non-flowering types were topped and sprayed when the majority of the plants possessed the requisite number of leaves at least 10-cm long.

In a preliminary test, the leaves were stripped from the upper half of the tobacco stalks to ensure that no leaves would prematurely trigger the sensors. The plants were then topped and sprayed with suckercide. The percentage of the plants to which the spray was delivered onto the top of the stalk was determined immediately.

Two topping heights were used at the first topping: high (X-cm); and low (X-6.4-cm). All treatments were topped "low" at the second and third toppings. The suckercide used was OFFSHOOT-T™, a mixture of fatty alcohols available from Cochran Corporation of Memphis, Tenn. A 4% concentration of the chemical was used at the first application; 5% and 6% concentrations were used at the second and third applications, respectively. The second applications were made 5–7 days after the first application; the third application was made 9 days after the second application.

Fifteen ml solutions were applied in 130 ms during each of the three applications. Application pressures were 1.38, 1.72, and $1.72 \times 10^5$ Pa, respectively, for the three applications. The sprayer was operated at 4.17 km/hr ground speed. Although the theoretical number of counts to be accumulated by the counter (see FIG. 5) is 101 (based on resolution of ground displacement and distance between light beam and manifold) before opening solenoid 20, the user must take into account the trajectory of the spray as it travels from manifold 16 toward the plant. Thus, a preset count of 70 was found to be necessary to ensure placement of the chemical on the top of the stalk.

At the end of the season, treatment plants were examined individually to determine whether the stalks contained any objectionable suckers. If a plant contained one or more objectionable suckers, the plant was rated as "not controlled".

An agricultural dye (AGMARK P-2™ from LAN Products, Inc. of Brownwood, Tex.) was added to the suckercide solution to provide easy visibility of the chemical. Upon application, the dye, an intense violet color, stains the plant tissue for a few hours before it photodegrades. Therefore, it was easy to observe where the chemical solution landed and its path of movement as it flowed downward from tobacco leaf axil to leaf axil. Because the suckercide used acts only upon contact with the sucker bud, the accumulation of the suckercide/dye in the leaf axil (as determined visually) provided an easy and rapid means of determining placement of the chemical solution on each plant. Additionally, the pith of the stalk, normally white immediately following topping, was turned a deep blue color when contacted by the chemical/dye solution. Thus, the blue color of the cut stalk was a definitive indication that the chemical solution had been applied directly over the stalk. Failure to deliver the chemical to the cut stalk left the pith white while a purple stain would generally be seen on the stalk immediately below the top.

Test Results

Examination of those plants from which the upper half of the leaves had been removed before topping and spraying revealed that 97.5% of the plants had received the spray on the top of the stalk, attesting to the ability of the unit to correctly place the chemical in the absence of potentially interfering leaves.

Visual examination of freshly topped and sprayed plants revealed that approximately 85–90% of the plants exhibited blue-colored pith, indicating that the chemical solution was placed directly over the top of the stalk. Two applications resulted in less than 6% of the plants not receiving correctly placed chemical at least once. Further examination of such plants also showed the chemical solution flowing downward into each leaf axil. In addition, 15 ml solution proved adequate to wet all leaf axils with only a small amount reaching the soil/plant interface and staining the soil around the stalk.

Examination of those plants on which precise placement of the chemical on the top of the stalk did not occur suggested several explanations. Firstly, some of those plants were leaning markedly toward an adjacent row, and although guide belts 12A, 12B straightened them up for passage through the topping and spraying mechanisms, they often continued to press tightly to one side of the belt. As a result, the chemical sometimes was not placed directly over the stalk, but landed below the tip. Secondly, for those leaning plants that did receive the chemical at the top, they immediately resumed their leaning posture upon exiting the guide belts, whereupon the chemical/dye could be observed to flow toward the lower side of the stalk during its downward movement. As a result, the chemical solution did not flow into some of the leaf axils on the upper side of the stalk, leaving them devoid of the chemical/dye solution and retaining the ability of the suckers to grow profusely. Thirdly, for some plants standing vertically in the row, it was observed that the chemical/dye landed several cm below the top of the stalk. Although difficult to casually observe, it is evident that a leaf, just below the tip of the cut stalk, that points toward the oncoming sprayer is sometimes not held below the floor of apparatus 10. When that occurs, the leaf rather than the stalk interrupts the near infrared light beam of the sensor, thereby triggering the counting circuit prematurely. Consequently, the solenoid opens prematurely, allowing the chemical to be sprayed in front of the stalk.

Anticipating the latter situation occurring, applicants designed a study to determine the effect of height of topping at the first application of suckercide. The degree of sucker control increased significantly ($p<0.07$) from 79% to 83% by topping 6.4-cm higher at the first application of the suckercide than subsequent toppings and chemical application. Applicants believe that the subsequent lower topping height physically removed suckers at the top of the plant that had escaped the chemical during the first application.

Even though the architecture of the top of the plants varies considerably between the flowering and nonflowering cultivars, no significant difference was observed in degree of sucker control between them, suggesting that the remaining plant architectures, after removal of the tops, were so similar as to have no effect on machine performance relative to precise placement of the suckercide.

Three applications of contact suckercide resulted in 84% season-long control in contrast to 68% for only two applications ($p<0.001$), suggesting that the novel system provides adequate control for grower purposes.

PREFERRED METHOD OF OPERATION

During its operation, apparatus 10 reference hereinafter being only to the left side apparatus shown in FIG. 5 functions as follows. Guide belts 12A, 12B gather the tops of the plants, straightens them vertically (so they are not leaning toward an adjacent row), and moves them into knife 14 of apparatus 10. The belts continue to guide the plants as they move rearward toward the infrared light beam of sensor 18 which is positioned about 7.5-cm behind the center of topper knife 14 and perpendicular to the row. When the light beam is broken by a plant, it activates timer circuit 19 to open solenoid 20 for 130 msec. to allow application of the chemical. Spray manifold 16, attached directly to solenoid valve 20, is located 34.3-cm behind the light beam and about 15-cm above the top of the stalk. Guide belts 12A, 12B continue to guide the plant as it moves beneath spray manifold 16 before releasing it. Depending upon ground speed of the sprayer, the characteristics of the counting device, the firing time of solenoid 20, and the setting of counting circuit 19 to delay the firing of solenoid 20, 15 ml chemical/plant will be applied ($1.38 \times 10^5$ Pascals) in a confined area (about 13–17-cm in dia.) directly over the top of the stalk by spray manifold 16.

The temporal aspects of the concurrent topping and chemical application operations are as follows. When 50% or more of the plants are in full bud, the plants are topped followed by an application of the fatty alcohol contact chemical to control suckers. The plants are topped slightly above (2.5–5.0-cm) normal topping height. The infrared light beam is located 2.5-cm lower than topping knife 14; therefore, a plant sufficiently tall to break the light beam will receive an application of the chemical, but it may or may not be topped. If it is not mechanically topped but is tall enough to break the light beam, the application of the contact chemical will likely terminate further growth of the bud in addition to suppressing the suckers on the plant. About 5 to 7 days after the first topping and chemical application, another pass is made through the field. This time, the topping height is about 5-cm lower than the first topping (i.e., normal topping height). Essentially every plant in the field will receive a chemical application during the second pass. In initial tests, complete sucker control was obtained on 65% of the plants in the early flower stage using a single pass to top and apply the fatty alcohol suckercide. The ultimate effectiveness of the system would be to top and to attain complete sucker control on all plants in a field with a single, 15 ml/plant application. To attain such a goal would require absolute plant uniformity with respect to flowering, ideal cultural conditions (e.g., the plants would be standing perfectly vertical), and a suckercide with sufficient activity to "burn" (dehydrate) the primary, secondary, and tertiary sucker buds in each leaf axil in a single application without causing leaf abscission (leaf drop).

The advantages to be derived from applicants' novel apparatus are:

(1) The guide systems on currently available mechanical toppers are stationary and depend on the plant sliding along the guide as the machine moves along the row. But, tobacco leaves are inherently sticky and the plants do not move smoothly along the guides, but rather move in jerks and spurts as friction between the plants and guides is overcome by the forward motion of the guides. In applicants' novel apparatus described herein, the guides are a pair of flat belts 12A, 12B (2.5–10-cm wide located 10-cm below the topping knife) that are regulated to travel at the same rate as the ground speed of the sprayer. Therefore, once the plant and belts have made contact, that point of contact will be maintained as the plant moves into topping knife 14, beneath spray manifold 16, and out the guides on the opposite end.

(2) By virtue of the fact that belt speed is automatically modulated to match ground speed, the point of contact between plant and belts 12A, 12B is maintained even though the sprayer machine ground speed may vary because of field conditions or operator adjustments. (3) Given that the sprayer moves 14.5-cm (at 4.2 KPH) during the 130 msec. solenoid 20 is open and that tobacco is planted approximately 53.3-cm apart in the row, SPOT SHOT™ sensor 18 provides an excellent means of determining the location of the plant within the length of the guides and opening solenoid 20 to dispense 15 ml spray directly over the top of the plant. Data obtained by applicants indicates that 15 ml is sufficient to wet all leaf axils on a plant without significant runoff from the stalk onto the soil surrounding the stalk. In contrast, conventional spraying of 30 ml over the top of the row results in some spraying of the chemical directly onto the ground, significant runoff of the chemical from the tip portion of the leaves onto the ground, and substantial runoff from the stalk onto the surrounding soil. Thus, it is evident that this feature of the system places the suckercide into the leaf axils where it is required for activity, reduces the amount of chemical necessary for effective control by one-half, and reduces the amount of chemical entering the environment.

(4) The electronic counting device 19 that allows one to delay the firing of solenoid 20 permits the distance between the light beam and the solenoid/spray manifold to be fixed. Without the device, it would be necessary to manually reposition one in relation to the other as ground speed was increased or decreased significantly from a nominal constant speed (e.g., 4.2 KPH).

(5) Manifold 16 (ca. 8.2-cm in dia.) permits the spray pattern to be reduced from a band about 45-cm wide to an area approximately 13–17-cm in dia. directly over the top of the stalk. Theoretically, because of the 14.5-cm travel of the sprayer (at 4.2 KPH) during the 130 msec. "ON" time of solenoid 20, the spray pattern is an elliptical one about 7.6-cm by 22.4-cm. In reality, one can visually discern an elliptical pattern, but the size varies from plant to plant. Nonetheless, studies using highly visible dyes have shown that the spray is usually centered over the top of the stalk.

Manifolds 16 containing different size holes and pattern arrangements will probably allow one to vary the shape and size of the spray pattern over the top of the plant to some degree. A shorter solenoid 20 "ON" time will also reduce the long axis of the ellipse by reducing the distance traveled during the chemical application, although the pressure, number of manifold holes, or hole sizes will need to be increased to maintain the 15 ml volume required for complete sucker control.

The greatest benefit of small manifold 16 is that it confines the spray to the center of the plant where nearly all of the chemical can be gathered by the leaf petioles and directed into the leaf axils as the chemical moves downward, in contrast to spray running off the tip of the leaves onto the ground and some spraying of the chemical directly onto the ground when a broader, and constant, spray pattern is used. Again, this feature reduces the amount of chemical required for effective suckercide activity and the amount of chemical that enters the environment.

(6) The number and size of holes in the disk of manifold 16 and manifold spray pressure must be adjusted to provide a large spray droplet size in order to facilitate the rapid collection of the spray by the leaf petioles and for the chemical solution to quickly move down the stalk.

It will be understood that various details of the invention may be changed without departing from the scope of the invention. Furthermore, the foregoing description is for the purpose of illustration only, and not for the purpose of limitation—the invention being defined by the claims.

What is claimed is:

1. An apparatus comprising a top area and a bottom area for simultaneously topping and precisely applying sucker control chemicals to tobacco plants and for related used, said apparatus comprising:

(a) a housing comprising a front and a back with two sides and a top extending therebetween, said front and bottom of the housing being open for receiving tobacco plants as said apparatus is motivated co-linearly along a tobacco plant row;

(b) blower means positioned in the top area of said apparatus for creating a downwardly directed air stream;

(c) cutting means positioned in the bottom area of said apparatus in the air stream created by said blower means for mechanically decapitating tobacco plants as they enter said housing and pass therebeneath;

(d) a pair of spaced apart rotating belt means positioned beneath said cutting means and defining a pathway from the front to the back of said housing for gathering tobacco plants at the front of said housing and guiding the tobacco plants therethrough for simultaneous topping and precision application of sucker control chemicals;

(e) spray means for applying the sucker control chemical generally downwardly and in a confined pattern onto the decapitated tobacco plants as they pass from said cutting means and beneath said spray means; and (f) circuit means comprising sensing means for determining the locations of tobacco plants that have been topped within the pathway of said pair of rotating belt means and for actuating application of the sucker control chemical through said spray means when the topped tobacco plants are properly oriented beneath said spray means.

2. An apparatus according to claim 1, wherein one or more of said housings are mounted together in spaced-apart relationship on an agricultural sprayer.

3. An apparatus according to claim 1, wherein said blower means comprises a fan and the fan is hydraulically driven.

4. An apparatus according to claim 3, wherein said hydraulically driven fan serves to drive said cutting means with a pulley and belt drive system.

5. An apparatus according to claim 1, wherein said spaced-apart belt means comprises two endless belts that are each driven by a corresponding hydraulic motor.

6. An apparatus according to claim 5, wherein each of said endless belts travels a pathway defined by a front and a back pulley.

7. An apparatus according to claim 5, including a drive wheel wherein said drive wheel speed is utilized to control the speed at which the two endless belts are driven to assure that the driven speed of said two endless belts is substantially the same as the ground speed of said apparatus.

8. An apparatus according to claim 1, wherein said spray means comprises a spray manifold mounted above the pathway of the pair of rotating belt means and behind said cutting means, said spray manifold being adapted to provide a spray pattern of about 13–17-cm in diameter over a topped tobacco plant.

9. An apparatus according to claim 1, wherein said circuit means comprises a near infrared sensor electrically connected to a solenoid valve to dispense a predetermined volume of the chemical through said spray means after detection of a tobacco plant and an electronic counting device to measure ground displacement of said apparatus to assure that a detected tobacco plant is properly located beneath said spray means.

10. An apparatus according to claim 9, wherein the predetermined volume of the chemical applied is about 15 ml per plant.

11. An apparatus comprising a top area and a bottom area for simultaneously topping and precisely applying sucker control chemicals to tobacco plants and for related uses, said apparatus comprising:

(a) a housing comprising a front and a back with two sides and a tip extending therebetween, said front and bottom of the housing being open for receiving tobacco plants as said apparatus is motivated co-linearly along a tobacco plant;

(b) blower means positioned in the top area of said apparatus for creating a downwardly directed air stream;

(c) cutting means positioned in the bottom area of said apparatus on the air stream created by said blower means for mechanically decapitating tobacco plants as they enter said housing and pass therebeneath;

(d) a pair of hydraulically driven spaced-apart rotating belts positioned beneath said cutting means and defining a pathway from the front to the back of said housing for gathering tobacco plants at the front of said housing and guiding the tobacco plants therethrough for simultaneous topping and precision application of sucker control chemical;

(e) a spray manifold for applying the sucker control chemical generally downwardly and in a confined pattern onto the decapitated tobacco plants as they pass from aid cutting means and beneath said spray manifold;

(f) circuit means comprising sensing means for determining the location of tobacco plants that have been topped within the pathway of said pair of rotating belts and for actuating application of the sucker control chemical through said spray manifold when the topped tobacco plants are properly oriented beneath said spray manifold; and (g) belt control means for maintaining the horizontal surface speed of said pair of hydraulically driven rotating belts at substantially the ground speed of said apparatus.

12. An apparatus according to claim 11, wherein two or more of said housings are mounted together in spaced-apart relationship on an agricultural sprayer.

13. An apparatus according to claim 11, wherein said blower means comprises a fan and the fan is hydraulically driven.

14. An apparatus according to claim 13, wherein said hydraulically driven fan serves to drive said cutting means with a pulley and belt drive system.

15. An apparatus according to claim 11, wherein each of said endless belts travels a pathway defined by a front and a back pulley.

16. An apparatus according to claim 11, wherein said belt control means comprises a drive wheel and wherein said drive wheel speed is utilized to control the speed at which the two endless belts are driven to assure that the driven speed of said two endless belts is substantially the same as the ground speed of said apparatus.

17. An apparatus according to claim 11, wherein said spray manifold is mounted above the pathway of the pair of rotating belts and behind said cutting means, said spray manifold being adapted to provide a spray pattern of about 13–17-cm in diameter over a topped tobacco plant.

18. An apparatus according to claim 11, wherein said circuit means comprises a near infrared sensor electrically connected to a solenoid valve to dispense a predetermined volume of the chemical through said spray manifold after detection of a tobacco plant, and an electronic counting device to measure ground displacement of said apparatus to assure that a detected tobacco plant is properly located beneath said spray manifold.

19. An apparatus according to claim 18, wherein the predetermined volume of the chemical applied is about 15 ml per plant.

* * * * *